(12) United States Patent
Estrada et al.

(10) Patent No.: US 10,193,424 B2
(45) Date of Patent: Jan. 29, 2019

(54) METHOD AND SYSTEM FOR WELDING ROTOR COILS

(71) Applicant: SIEMENS ENERGY, INC., Orlando, FL (US)

(72) Inventors: Margarita Estrada, Gastonia, NC (US); Randall S. Garrett, Tega Cay, SC (US); Ethan Miller, Charlotte, NC (US)

(73) Assignee: SIEMENS ENERGY, INC., Orlando, FL (US)

( * ) Notice: Subject to any disclaimer, the term of this patent is extended or adjusted under 35 U.S.C. 154(b) by 167 days.

(21) Appl. No.: 15/278,245

(22) Filed: Sep. 28, 2016

(65) Prior Publication Data

US 2018/0091028 A1    Mar. 29, 2018

(51) Int. Cl.
| | |
|---|---|
| *H01F 7/06* | (2006.01) |
| *H02K 15/00* | (2006.01) |
| *H02K 3/12* | (2006.01) |
| *H02K 15/09* | (2006.01) |

(52) U.S. Cl.
CPC ........... *H02K 15/0068* (2013.01); *H02K 3/12* (2013.01); *H02K 15/09* (2013.01)

(58) Field of Classification Search
CPC ....... H02K 3/12; H02K 15/09; H02K 15/0068
See application file for complete search history.

(56) References Cited

U.S. PATENT DOCUMENTS

| 4,462,152 | A * | 7/1984 | Okamoto | H02K 3/46 |
| | | | | 29/598 |
| 9,455,613 | B2 * | 9/2016 | Grobe | H02K 3/12 |
| 2003/0098336 | A1 | 5/2003 | Yamashita | |
| 2006/0102689 | A1 | 5/2006 | Trapp et al. | |
| 2015/0028702 | A1 | 1/2015 | Grobe et al. | |

FOREIGN PATENT DOCUMENTS

| DE | 10038234 A1 | 2/2002 |
| JP | 2001267120 A | 9/2001 |
| JP | 2007319931 A | 12/2007 |
| WO | 2009077594 A1 | 6/2009 |

* cited by examiner

*Primary Examiner* — Paul D Kim

(57) ABSTRACT

A process and a system for welding rotor coils are presented. A plurality of rotor coils are arranged on a table of a machine. A welding tool welds the rotor coils on one end using a Friction Stir Welding process. Transition pieces are each arranged between the rotor coils to create a continuous welding path. A run-off tab is placed at an end of the welding path. The welding tool is changed to a milling tool after completion of the welding. The milling tool traces back along the welding path to separate the rotor coils. The milling tool may be changed to the welding tool to repeat the process for another end of the rotor coils. The process is completely automatic and controlled by a control unit.

16 Claims, 7 Drawing Sheets

METHOD AND SYSTEM FOR WELDING ROTOR COILS

FIELD OF THE INVENTION

This invention relates generally to a process and a system for welding rotor coils, in particular friction stir welding rotor coils.

DESCRIPTION OF THE RELATED ART

A generator may include a plurality of components, such as a rotor. The rotor may include a plurality of rotor coils. Traditionally, rotor coils are joined using brazing processes. Brazing processes may only join a single joint at a time. Brazing may be a manual process. Quality of a braze joint of rotor coils may depend on operator abilities. Such a manual process is unreliable. In addition, a brazing process may limit joint locations within the rotor coils.

Destructive testing of samples may be required for braze joining of rotor coils. Rotor coils may be machined to move a braze joint away from a corner to overcome limitation of braze joint locations within the rotor coils.

SUMMARY OF THE INVENTION

Briefly described, aspects of the present invention relate to a process and a system for welding rotor coils, in particular friction stir welding rotor coils.

According to an aspect, a process for welding rotor coil is presented. The process comprises arranging a plurality of rotor coils on a table. Each rotor coil comprises an end arc section and a straight section. The straight section is arranged on one end of the end arc section. The process comprises welding the straight section to the one end of the end arc section of the each rotor coil at a joint using a welding tool. The welding tool forms a welding path that welds the plurality of rotor coils on the one end from a welding start to a welding end. The process comprises separating the plurality of rotor coils using a milling tool.

According to an aspect, a system for welding rotor coil is presented. The system comprises a machine. The machine comprises a table. A plurality of rotor coils are arranged on the table. Each rotor coil comprises an end arc section and a straight section. The straight section is arranged on one end of the end arc section. The machine comprises a welding tool that is configured to weld the straight section to the one end of the end arc section of the each rotor coil at a joint. The welding tool forms a welding path that welds the plurality of rotor coils on the one end from a welding start to a welding end. The machine comprises a milling tool that is configured to separate the plurality of rotor coils. The system comprises a control unit that is configured to control the machine.

Various aspects and embodiments of the application as described above and hereinafter may not only be used in the combinations explicitly described, but also in other combinations. Modifications will occur to the skilled person upon reading and understanding of the description.

BRIEF DESCRIPTION OF THE DRAWINGS

Exemplary embodiments of the application are explained in further detail with respect to the accompanying drawings. In the drawings.

To facilitate understanding, identical reference numerals have been used, where possible, to designate identical elements that are common to the figures.

DETAILED DESCRIPTION OF INVENTION

A detailed description related to aspects of the present invention is described hereafter with respect to the accompanying figures.

Figure 1:
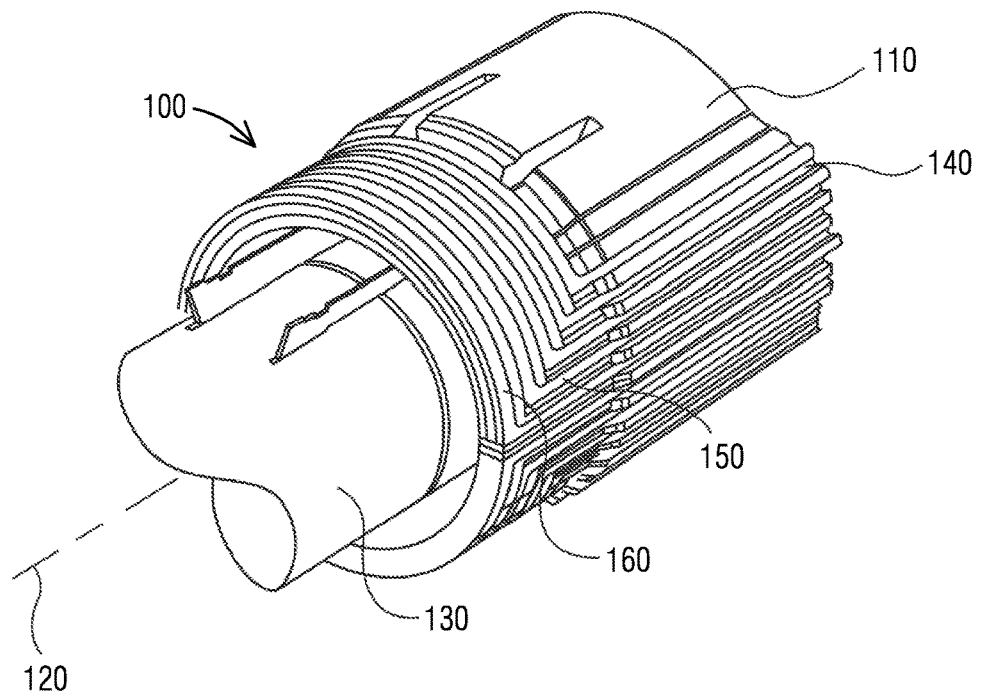
FIG. 1 illustrates a perspective diagram of a rotor.

FIG. 1 illustrates a perspective diagram of a rotor 100. The rotor 100 may rotate about a longitudinal axis 120. The rotor 100 may include a cylindrically shaped rotor body 110. The rotor 100 may include a rotor shaft 130 extending along the longitudinal axis 120. An outer surface of the cylindrically shaped rotor body 110 may include a plurality of rotor coils 140. Each of the rotor coils 140 may include a straight section 150 axially extending along the outer surface of the rotor body 110. Each of the rotor coils 140 may include an end arc section 160 transversely connected to the straight section 150. The straight sections 150 and the end arc sections 160 may include copper material.

Figure 2:
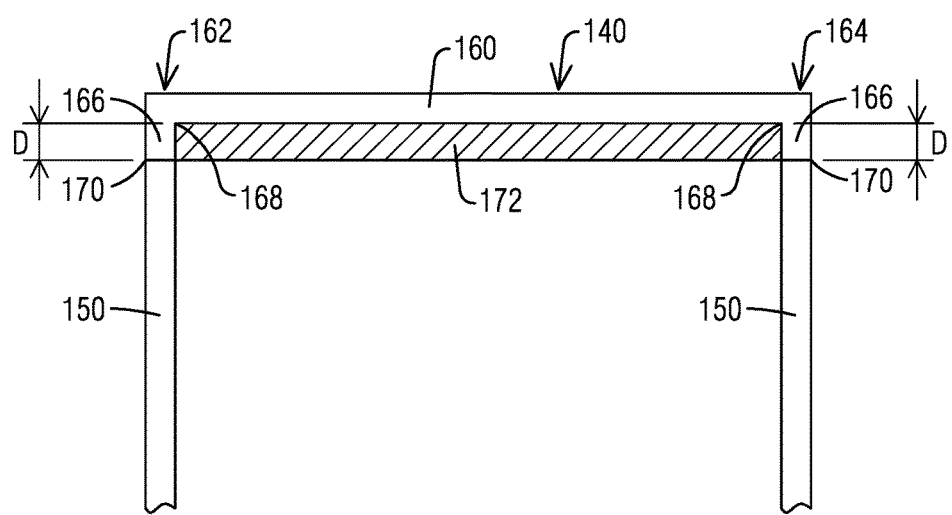
FIG. 2 illustrates a schematic diagram of a braze joint of a rotor coil.

The straight section 150 of each rotor coil 140 may be connected to the end arc section 160 of each rotor coil 140 by a weld joint. FIG. 2 illustrates a schematic diagram of a braze joint 170 of rotor coil 140. The rotor coil 140 may include an end arc 160. The end arc section 160 may have one end 162 and another end 164 each connected to a straight section 150. A corner section 168 may be formed between the end arc section 160 and the straight section 150. Stress concentrations may occur at a proximity area of the corner section 168. A braze joint 170 for connecting the end arc section 160 to the straight section 150 may have to move away from the corner section 168 so that the braze joint 170 may be not subjected to the stress concentration at the corner section 160. As illustrated in FIG. 2, the end arc section 160 may include a leg section 166 extending toward the straight section 150. The leg section 166 and the end arc section 160 may be manufactured as one piece. The straight section 150 is brazed to the leg section 166 at the braze joint 170. The leg section 166 may have a length D so that the braze joint 170 may be sufficiently spaced away from the corner section 168. A braze filler material may be used to form the braze joint 170. Filler material may significantly decrease electrical conductivity of the rotor coils 140. Excess copper 170 may be required for brazing rotor coils 140. Joining defects are unavoidable in brazing rotor coils 140. A braze joint 170 is a manual process performed by an operator. Quality of the braze joint 170 heavily depends on the operator's abilities. The operator may only weld one braze joint 170 at a time.

Figure 3:
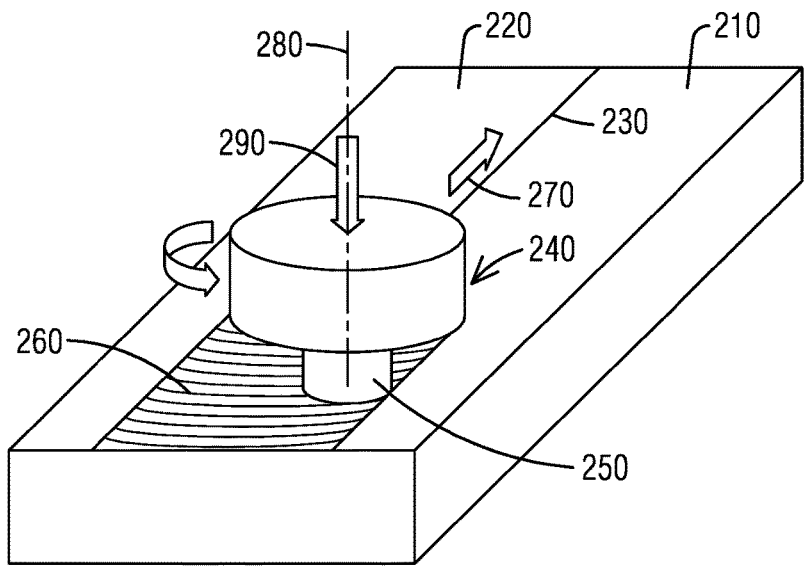
FIG. 3 illustrates a schematic diagram of a Friction Stir Welding process.

Friction Stir Welding (FSW) is an automatic metal welding process. FIG. 3 illustrates a schematic diagram of a FSW process. A metal plate 210 is to be welded to anther metal plate 220 along a butt joint section 230 between the two metal plates 210 and 220. A welding tool 240 may include a pin 250. The welding tool 240 may move in a translation direction 270 along the butt joint section 230 while rotating about a rotation axis 280. A downward force 290 may be applied on the welding tool 240. The pin 250 is plunged into the butt joint section 230. Friction heat is generated between the pin 250 and the metal plates 210 and 220 during movement. The friction heat may cause a plasticized zone around the pin 250 that stirs and melds the metal plates 210 and 220. A Friction Stir welded rejoin 260 is formed along the butt joint section 230. FSW process is a non fusion welding process. FSW process may avoid weld defects. FSW process may not require filler material. FSW process may significantly improve electrical conductivity in the welded rejoin 260. FSW process may significantly improve mechanical properties of the welded rejoin 260. FSW process may be completely controlled by a computer. The computer may adjust a welding parameter of the welding tool 240 to produce a successful welded rejoin 260 along the butt joint section 230. The welding parameter of the welding tool may include a rotational welding speed about the rotation axis 280, a translational welding speed in the translation direction 270, etc. The welding parameter of the welding tool may include force value of the welding tool 240, such as a torque value or a value of the downward force 290, etc.

Figure 4:
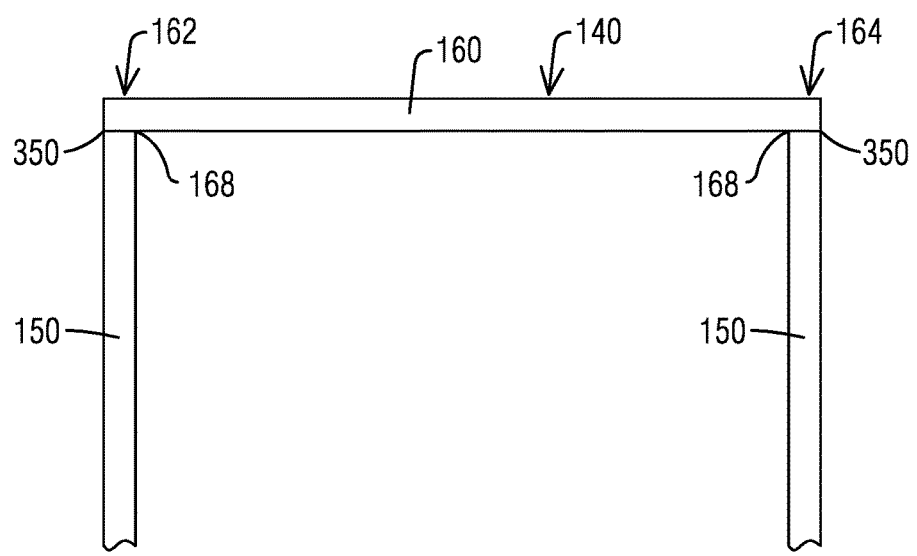
FIG. 4 illustrates a schematic diagram of a Friction Stir Welded joint of a rotor coil according to an embodiment.

FIG. 4 illustrates a schematic diagram of a Friction Stir Welded joint 350 of a rotor coil 140 according to an embodiment. The rotor coil 140 may include an end arc 160. The end arc section 160 may have one end 162 and another end 164 each connected to a straight section 150. A corner section 168 may be formed between the end arc section 160 and the straight section 150. The straight section 150 may be connected to the end arc section 160 at the corner section 168 by a Friction Stir Welded joint 350 using a FSW process. The Friction Stir Welded joint 350 may have significantly better mechanical properties than a braze joint 170, for example, better tensile strength, yield strength, hardness, and fatigue. The Friction Stir Welded joint 350 may be placed at the corner section 168 between the end arc section 160 and the straight section 150 due to good mechanical properties. No filler material may be required for the Friction Stir Welded joint 350. Electrical conductivity of the Friction Stir Welded joint 350 may be significantly improved with respect to a braze joint 170. FSW process may eliminate excess copper 172 as illustrated in FIG. 2 which may be required for a brazing process.

Figure 5:
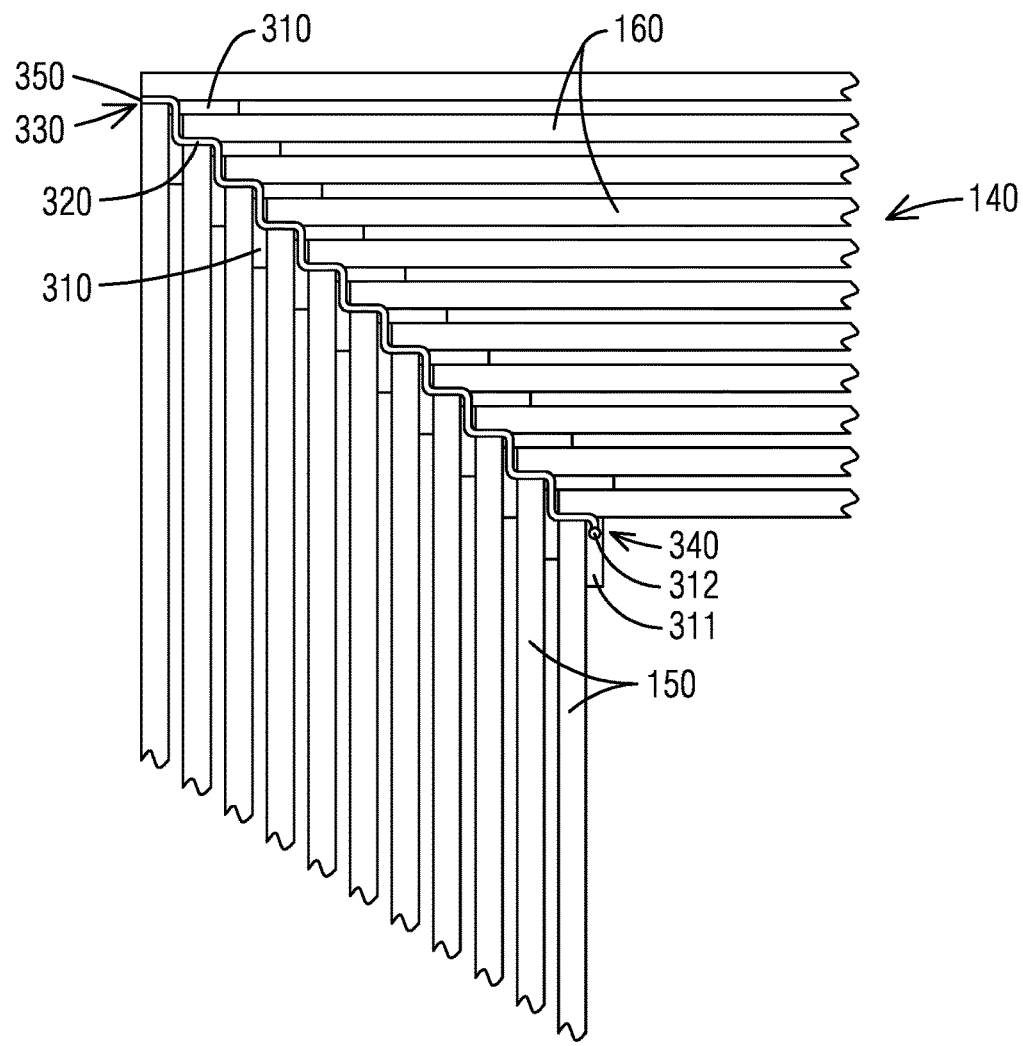
FIG. 5 illustrates a schematic diagram of a welding path of rotor coils according to an embodiment.

FIG. 5 illustrates a schematic diagram of a welding path 320 of rotor coils 140 according to an embodiment. In the exemplary illustrated embodiment of FIG. 5, a plurality of rotor coils 140 are arranged together to form a stack arrangement in one set up. Each of the rotor coils 140 may include an end arc section 160 and a straight section 150. The straight section 150 may be arranged at one of the ends 162 or 164 of the end arc section 160. A welding path 320 may be formed by a welding tool 240 performing a FSW process. The welding path 320 may start from a welding start 330 and end at a welding end 340. The welding path 320 may weld the plurality of rotor coils 140 on one end in one set up. A plurality of transition pieces 310 may be each arranged between the rotor coils 140 along the welding path 320 to create a continuous welding path 320. The transition pieces 310 may include a material that may be suitable for the FSW process. For example, the transition pieces 310 may include a copper material. A run-off tab 311 may be placed at the welding end 340. The welding tool 240 may create a hole 312 on the run-off tab 311 when it exits the FSW process. The run-off tab 311 may include a material that may be suitable for the FSW process. The run-off tab 311 may have the same configuration as the transition pieces 310. A Friction Stir Welded joint 350 may be formed at a corner section 168 between the end arc section 160 and the straight section 150, which is illustrated in FIG. 4.

Figure 6:
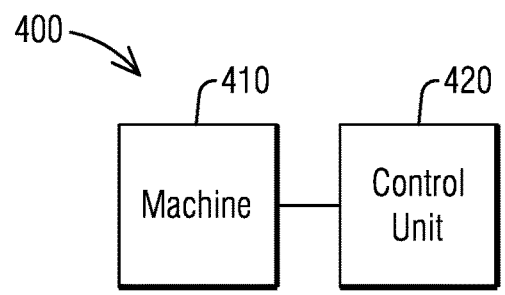
FIG. 6 illustrates a system for welding rotor coils according to an embodiment.

FIG. 6 illustrates a schematic diagram of a system 400 for welding rotor coils 140 according to an embodiment. The system 400 may include a machine 410. The machine 410 may include a table for arranging the rotor coils 140. The machine 410 may include a welding tool 240 for welding the rotor coils 140 using a FSW process. The machine 410 may include a milling tool for separating the welded rotor coils 140. The system 400 may include a control unit 420. According to an embodiment, the control unit 420 may be a computer. The control unit 420 may control the machine 410 so that the FSW process and the milling process are automatically performed.

Figure 7:
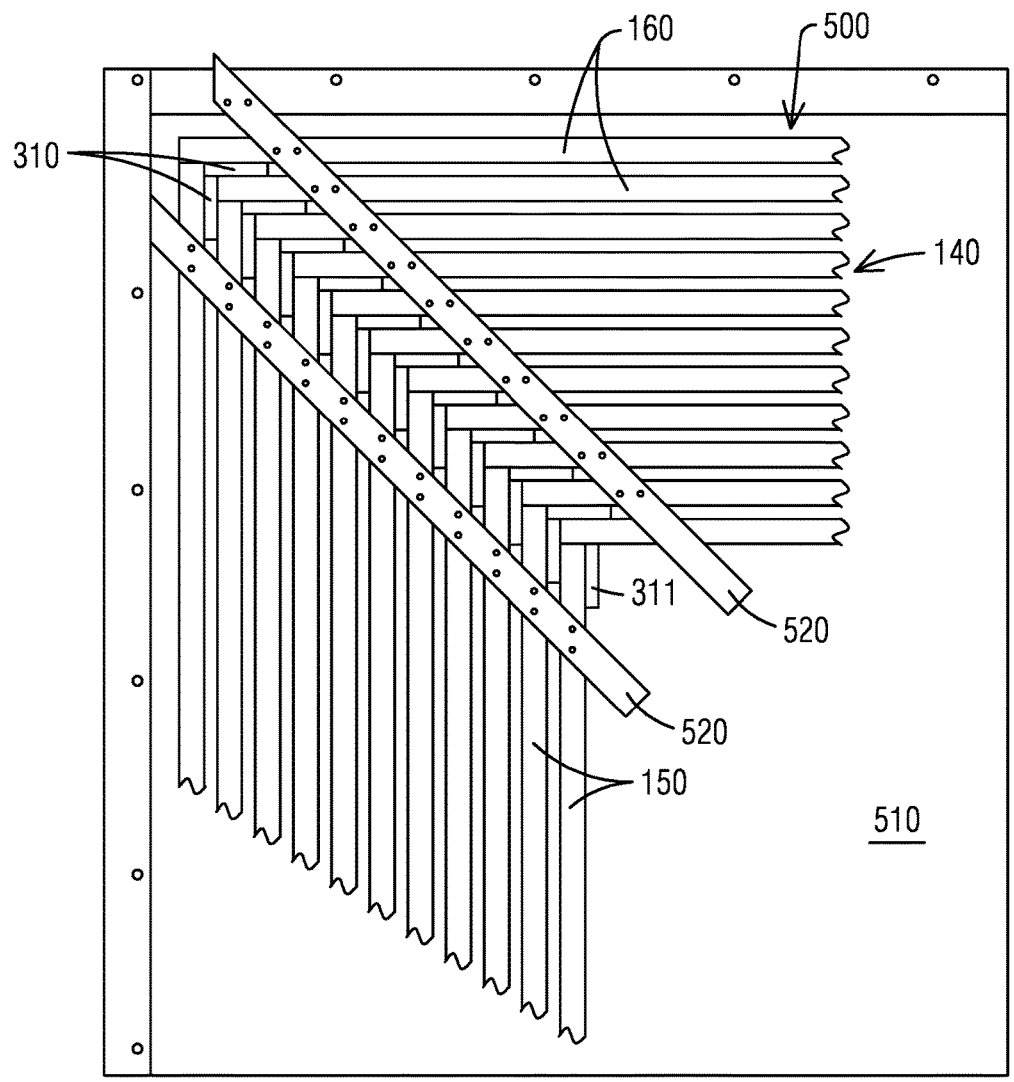
FIG. 7 illustrates a schematic diagram of an arrangement for welding rotor coils according to an embodiment.

FIG. 7 illustrates a schematic diagram of a rotor coil arrangement 500 for welding rotor coils 140 according to an embodiment. A plurality of rotor coils 140 are arranged on a table 510. The table 510 may be a component of a machine 410. The rotor coils 140 may be arranged together to form a stack arrangement 500. The number of rotor coils 140 that may be arranged on the table 510 in one set up may depend on a size of the table 510. The rotor coils 140 may be fastened on the table 510 by fasten devices 520. According to an embodiment, the fasten devices 520 may include clamps, screws, table fixtures, etc. The embodiment of the rotor coil arrangement 500 may correspond to the embodiment illustrated in FIG. 5. Corresponding parts of the rotor coil arrangement 500 are correspondingly numbered, but are not described again with reference to FIG. 7.

Figure 8:
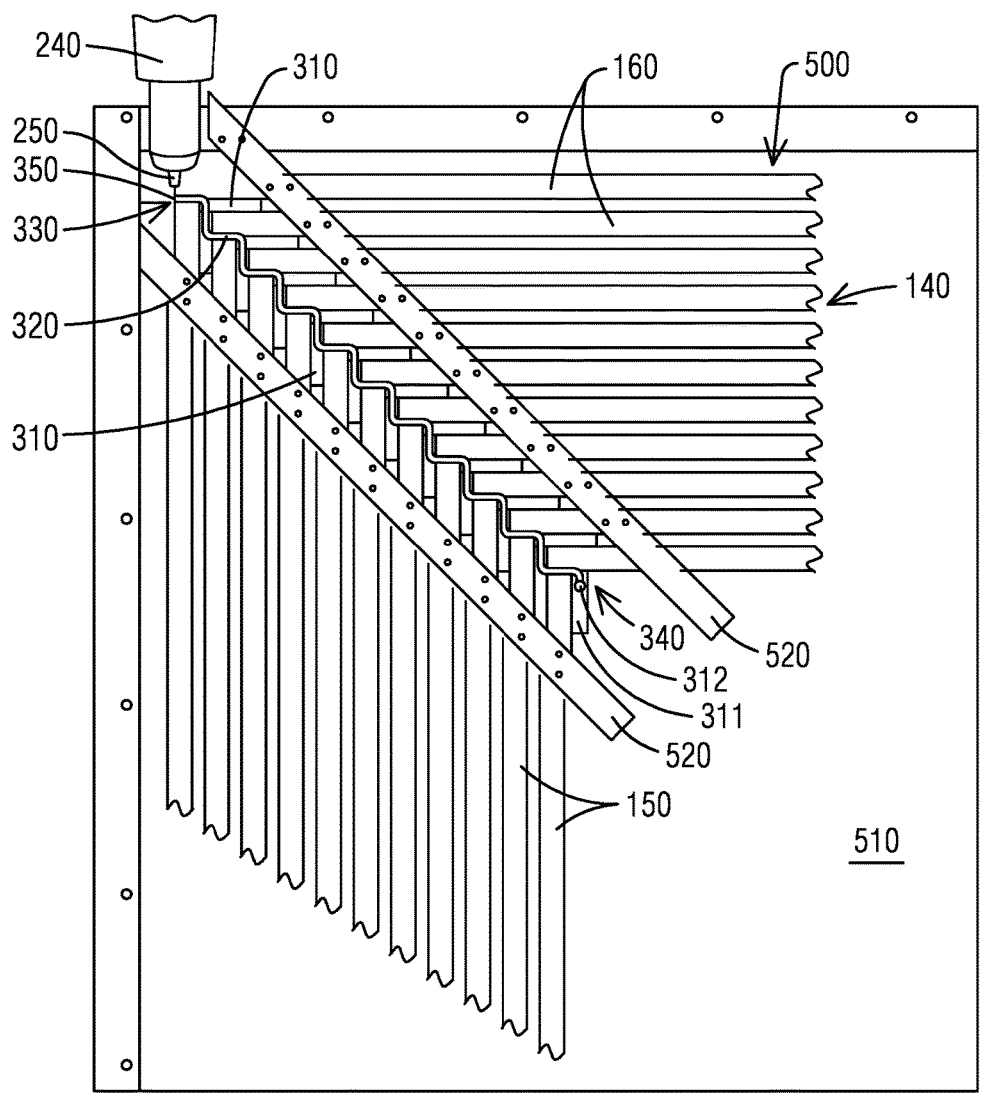
FIG. 8 illustrates a schematic diagram of a welding process for welding rotor coils using a welding tool according to an embodiment.

FIG. 8 illustrates a schematic diagram of a welding process for welding rotor coils 140 using a welding tool 240 according to an embodiment. The welding tool 240 may be a component of a machine 410. The welding tool 240 may be customized for different applications of rotor coils 140. The welding tool 240 may include a pin 250. The welding tool 240 may weld the rotor coils 140 using a FSW process. The welding tool 240 may form a welding path 320 that welds the plurality of the rotor coils 140 at one end of the rotor coils 140. A plurality of transition pieces 310 may be each arranged between the rotor coils 140 along the welding path 320 to create a continuous welding path 320. The welding tool 240 may start the welding process from a welding start 330. The welding tool 240 may complete the welding process at a welding end 340. A run-off tab 311 may be placed at the welding end 340. The welding tool 240 may create a hole 312 on the run-off tab 311 when it exits the FSW process. A Friction Stir Welded joint 350 may be formed at a corner section 168 between the end arc section 160 and the straight section 150 as illustrated in FIG. 4.

The welding tool 240 may be controlled by a control unit 420. The control unit 420 may adjust a welding parameter of the welding tool 240 to produce an optimum quality of a Friction Stir Welded joint 350. The welding parameter of the welding tool 240 may include a rotational welding speed, a translational welding speed, torque, downward force value, etc. The control unit 420 may adjust a combination of the welding parameters of the welding tool 240. The control unit 420 may set the welding parameters of the welding tool 240 based on different configurations of the rotor coils 140. For example, the control unit 420 may change the welding parameters of the welding tool 240 for different material types of the rotor coils 140, or different thickness of the rotor coils 140, etc. The welding parameters of the welding tool 240 may be recorded and stored in the control unit 620. The stored welding parameters of the welding tool 240 may provide a repeatability of the process.

A threshold range of a welding parameter of the welding tool 240 may be stored in the control unit 420. The control unit 420 may generate an alert signal or stop the welding process if the welding parameter of the welding tool 240 is beyond the threshold range.

Figure 9:
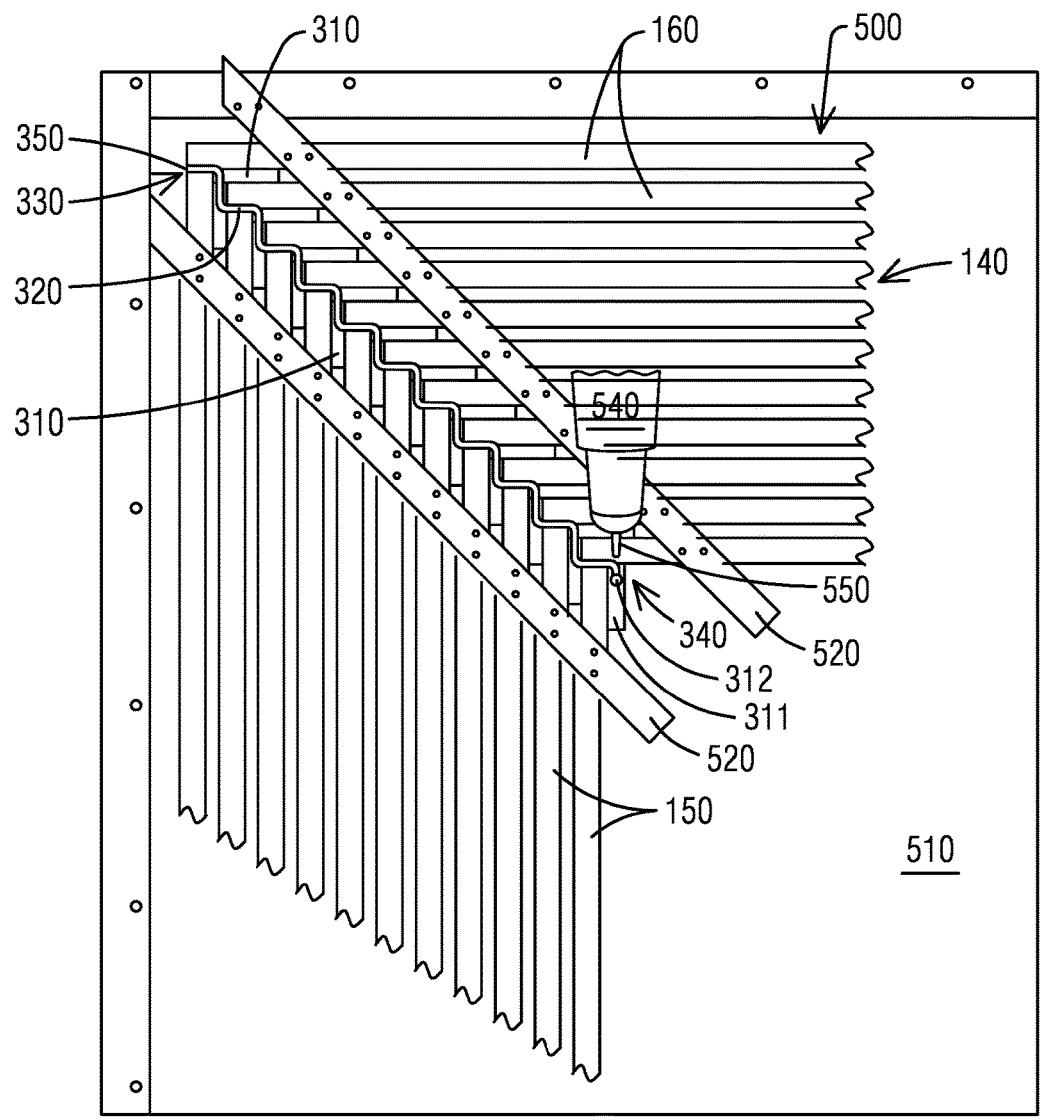
FIG. 9 illustrates a schematic diagram of a milling process for separating rotor coils using a milling tool according to an embodiment.

FIG. 9 illustrates a schematic diagram of a milling process for separating the rotor coils 140 using a milling tool 540 according to an embodiment. As illustrated in an embodiment of FIG. 8, the rotor coils 140 may be welded at one end by a welding tool 240 using a FSW process. A continuous welding path 320 may be formed after completing the welding process. In an exemplary embodiment of FIG. 9, the welding tool 240 may be changed to a milling tool 540 after the completion of the welding process. The milling tool 540 may be a component of a machine 410. The milling tool 540 may include a cutter 550. The milling tool 540 may trace back along the continuous welding path 320 from the welding end 340 to the welding start 330. The milling tool 540 may cut the continuous welding path 320 starting from the run-off tab 311 and at locations of the transition pieces 310 arranged between the rotor coils 140 to separate the rotor coils 140. The milling tool 540 may be guided by a control unit 420 when performing the milling process. The milling process may be performed right after the welding process without changing the set up of the rotor coils 140.

The control unit 420 may control the milling tool 540 to create an inner diameter radius or an outer diameter radius at a corner section 168 between the end arc section 160 and the straight section 150 while separating the rotor coils 140. A value of the inner diameter radius or the outer diameter radius may be set by the control unit 420 to a predefined value.

Figure 10:
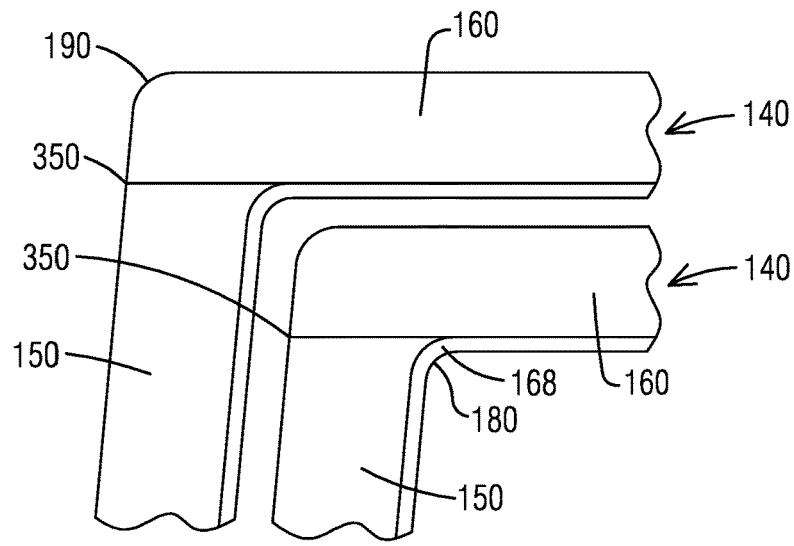
FIG. 10 illustrates a perspective diagram of Friction Stir Welded rotor coils according to an embodiment.

FIG. 10 illustrates a perspective diagram of Friction Stir Welded rotor coils 140 according to an embodiment. A straight section 150 of a rotor coil 140 may be welded to one end of an end arc section 160 of the rotor coil 140 by a Friction Stir Welded joint 350. The Friction Stir Welded joint 350 may be placed at a corner section 168 between the end arc section 160 and the straight section 150. An inner diameter radius 180 of the corner section 168 may be created by the milling tool 540 while separating the rotor coils 140. An outer diameter radius 190 of the corner section 168 may be created by the milling tool 540 while separating the rotor coils 140.

Figure 11:
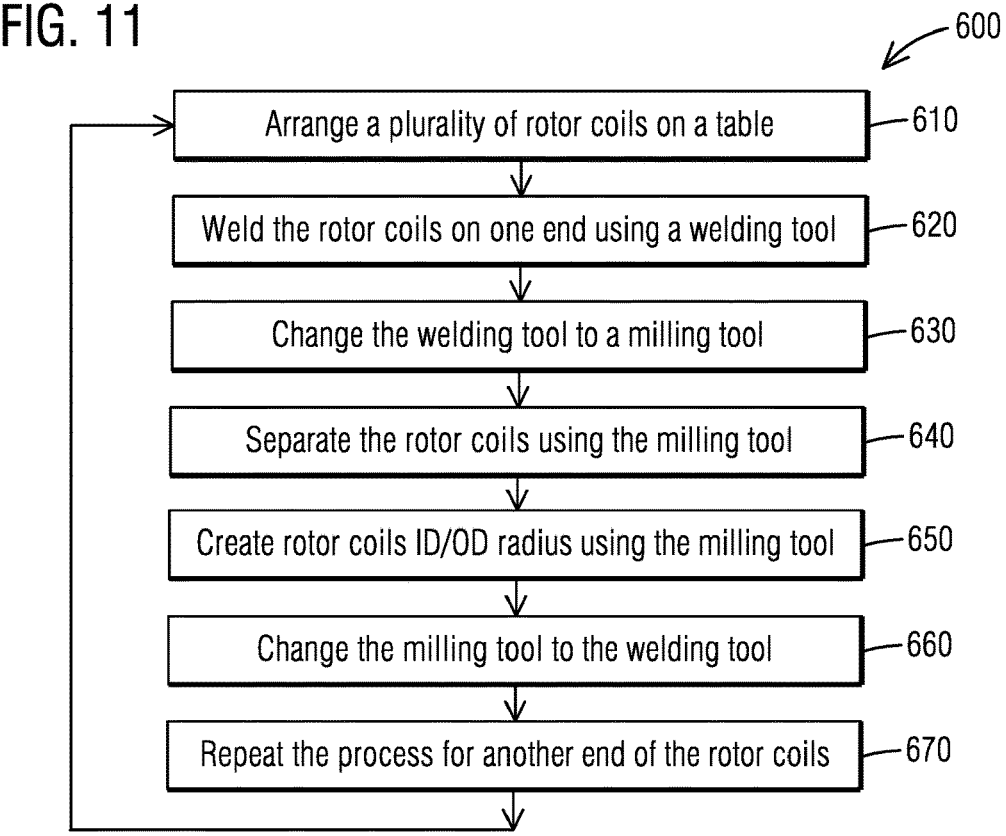
FIG. 11 illustrates a flow chart of a process for welding rotor coils according to an embodiment.

FIG. 11 illustrates a flow chart of a process 600 for welding rotor coil 140 according to an embodiment. In step 610, a plurality of rotor coils 140 may be arranged on a table 510. The rotor coils 140 may be fastened on the table 510 by fasten devices 520. A plurality of transition pieces 310 may be each arranged between the rotor coils 140 along a welding path 320 to create a continuous welding path 320. A run-off tab 311 may be placed at a welding end 340. In step 620, the rotor coils 140 may be welded on one end using a welding tool 240. The welding tool 240 may weld the rotor coils 140 using a FSW process. The FSW process may be completely automatic and controlled by a control unit 420, such as a computer. In step 630, the welding tool 240 may be changed to a milling tool 540 after a completion of the FSW process. In step 640, the milling tool 540 may trace back along the continuous welding path 320 to separate the rotor coils 140. The milling tool 540 may be guided by the control unit 420 to trace back along the welding path 320. In step 650, the milling tool 540 may create an inner diameter radius or an outer diameter radius at a corner section 168 of each rotor coil 140 while separating the rotor coils 140. In step 660, the milling tool 540 may be changed back to the welding tool 240 after a completion of separating the rotor coils 140. The process steps may be repeated for anther end of the rotor coils 140 in step 670.

According to an aspect, the illustrated process may allow a plurality of rotor coils 140 to be welded in one pass. The illustrated process may allow the rotor coils 140 to be separated right after the welding process without changing the set up of the rotor coils 140.

According to an aspect, the illustrated process may be automatic and controlled by a control unit 420. The process may be completely performed by a FSW machine. The process may provide labor and time savings for welding rotor coils 140. The process may be developed to produce an optimum quality Friction Stir Welded joint 350 of rotor coils 140. The process may be adapted to different sizes and geometries of rotor coils 140. Parameters of the process may be stored in the control unit 420 for repeatable welding processes of rotor coils 140 to ensure the best quality Friction Stir Welded joint 350 of rotor coils 140 in each application.

According to an aspect, the illustrated process may eliminate restrictions of rotor coils 140 welding joint location. The process may allow a Friction Stir Welded joint 350 to be placed at a corner section 168 between an end arc section 160 and a straight section 150 of rotor coils 140.

According to an aspect, the illustrated process may significantly improve a quality of rotor coils 140 joining. The proposed process may provide a seamless Friction Stir Welded joint 350 without brazing defects. The proposed process does not require filler material which provides a better electrical conductivity of the Friction Stir Welded joint 350 compared to a braze joint 170. The proposed process provides significant improvement on mechanical properties of the Friction Stir Welded joint 350 compared to a braze joint 170.

According to an aspect, the illustrated process may provide coat savings. The proposed process may require less copper material and no filler material. The proposed process may not require Nondestructive examination. The proposed process may not require personal protection equipments as required on traditional welding process.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

REFERENCE LIST

100: Rotor
110: Rotor Body
120: Longitudinal Axis
130: Rotor Shaft
140: Rotor Coil
150: Straight Section
160: End Arc Section
162: One End
164: Another End
166: Leg Section
168: Corner Section
170: Braze Joint
172: Excess Copper
180: Inner Diameter Radius
190: Outer Diameter Radius
210, 220: Metal Plate
230: Butt Joint Section
240: Welding Tool
250: Pin
260: Friction Stir Welded Rejoin
270: Translation Direction
280: Rotation Axis
290: Downward Force
310: Transition Piece
311: Run-off Tab
312: Hole
320: Welding Path
330: Welding Start
340: Welding End
350: Friction Stir Welded Joint
400: System for Welding Rotor Coils
410: Machine
420: Control Unit
500: Rotor Coil Arrangement
510: Table
520: Fasten Device
540: Milling Tool
550: Cutter
600: Process for Welding Rotor Coil

What is claimed is:

1. A process for welding rotor coil comprising:
arranging a plurality of rotor coils on a table, wherein each rotor coil comprises an end arc section and a straight section, and wherein the straight section is arranged on one end of the end arc section;
arranging a plurality of transition pieces each between the rotor coils on the one end;
forming a continuous welding path using a welding tool for welding the straight section to the one end of the end arc section of the each rotor coil at a joint, and the plurality of rotor coils at locations of the transition pieces on the one end from a welding start to a welding end; and
cutting the continuous welding path using a milling tool from the welding end to the welding start at the locations of the transition pieces for separating the plurality of rotor coils.

2. The process as claimed in claim 1, wherein the welding tool welds the rotor coils using a Friction Stir Welding process.

3. The process as claimed in claim 1, wherein the process is controlled by a control unit.

4. The process as claimed in claim 3, further comprising adjusting a welding parameter of the welding tool by the control unit, wherein the welding parameter of the welding tool is selected from the group consisting of: a rotational welding speed, a transitional welding speed, a torque value, a downward force value, and combinations thereof.

5. The process as claimed in claim 3, further comprising generating an alert signal if the welding parameter of the welding tool is beyond a threshold range.

6. The process as claimed in claim 1, further comprising placing a run-off tab at the welding end.

7. The process as claimed in claim 1, wherein the joint is formed at a corner section between the end arc section and the straight section.

8. The process as claimed in claim 7, further comprising creating an inner diameter radius or an outer diameter radius at the corner section using the milling tool while separating the rotor coils.

9. The process as claimed in claim 1, further comprising:
changing the milling tool to the welding tool after separating the rotor coils; and
repeating the process for welding the rotor coils at another end of the end arc section.

10. A system for welding rotor coil comprising:
a machine comprising:
a table for supporting a plurality of rotor coils arranged thereon, each rotor coil comprising an end arc section and a straight section, and wherein the straight section is arranged on one end of the end arc section;
a plurality of transition pieces that are each arranged between the rotor coils;
a welding tool that is configured to form a continuous welding path for welding the straight section to the one end of the end arc section of the each rotor coil at a joint and the plurality of rotor coils at locations of the transition pieces on the one end from a welding start to a welding end; and
a milling tool that is configured to cut the continuous welding path from the welding end to the welding start at the locations of the transition pieces for separating the plurality of rotor coils; and
a control unit that is configured to control the machine.

11. The system as claimed in claim 10, wherein the welding tool is configured to weld the rotor coils using a Friction Stir Welding process.

12. The system as claimed in claim 10, wherein the control unit is configured to adjust a welding parameter of the welding tool, and wherein the welding parameter of the welding tool is selected from the group consisting of: a rotational welding speed, a transitional welding speed, a torque value, a downward force value, and combinations thereof.

13. The system as claimed in claim 12, wherein the control unit generates an alert signal if the welding parameter of the welding tool is beyond a threshold range.

14. The system as claimed in claim 10, further comprising a run-off tab that is placed at the welding end.

15. The system as claimed in claim 10, wherein the joint is formed at a corner section between the end arc section and the straight section.

16. The system as claimed in claim 15, wherein the milling tool creates an inner diameter radius or an outer diameter radius at the corner section while separating the rotor coils.

* * * * *